Dec. 22, 1942. O. D. TOUCHSTONE 2,306,112
CASTING ROD TIP
Filed Oct. 29, 1940
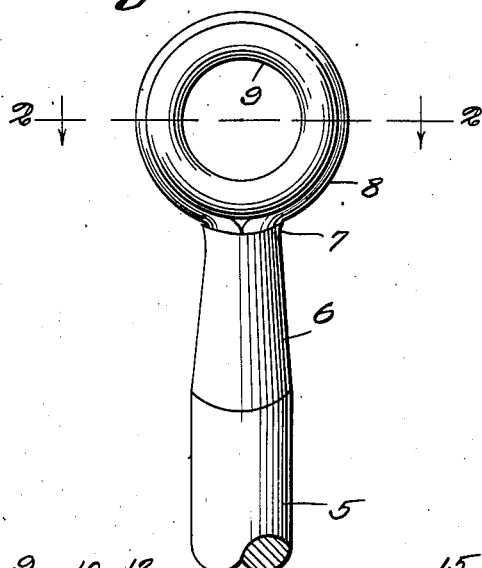
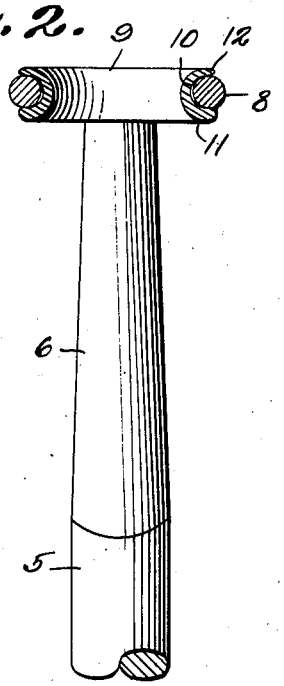
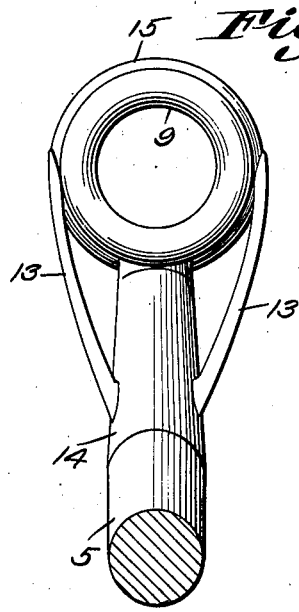
Otis D. Touchstone
INVENTOR.
BY Knowles
ATTORNEYS.

Patented Dec. 22, 1942

2,306,112

UNITED STATES PATENT OFFICE 2,306,112

CASTING ROD TIP

Otis D. Touchstone, San Angelo, Tex., assignor of one-half to Clyde Vinson, San Angelo, Tex.

Application October 29, 1940, Serial No. 363,356

1 Claim. (Cl. 43—24)

This invention relates to fishing rod guides, including tips and intermediate guides, and more particularly to fishing rod tips and guides used in casting.

The primary object of the invention is to provide guides for a fishing rod, including the tip and intermediate guides, which are constructed in such a way that the fishing line will run freely, eliminating any possibility of the fishing line cutting or tangling about the tip.

An important object of the invention is to provide guides for a fishing rod, including the tip and intermediate guides, embodying a securing ring and an eye rotatably mounted within the securing ring, so that as the ring rotates, due to contact with the fishing line, the contacting surface between the eye and line will be constantly changed, preventing any possibility of the fishing line wearing grooves in the eye, which present rough surfaces and tend to cut the fishing line.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a plan view of the fishing tip guide.

Figure 2 is a sectional view taken on line 2—2 of Figure 1.

Figure 3 is an elevational view of a modified form of fishing rod tip guide.

Referring to the drawing in detail, the reference character 5 designates the tip end of a casting rod, to which a fishing line guide, forming the subject matter of the present invention, is secured, forming the tip guide of the fishing casting rod.

The tip comprises a furrule 6 which tapers to fit over the tapered end of the casting rod. The outer end of the ferrule is curved slightly as at 7 and is constructed to receive the ends of the securing ring 8, which is constructed of wire material, and curved to provide a ring of slightly greater diameter than the eye member supported therein, and to be hereinafter more fully described.

The eye, which is indicated by the reference character 9, is formed with an annular groove 10 arranged in the periphery thereof, the groove being so constructed as to provide a substantially thick inner portion 11 and a thin outer portion 12, the thick inner portion being so constructed as to compensate for excessive wear directed to the eye, due to the fishing line moving therethrough.

As many guides as desired may be attached to the fishing casting rod between the reel and the tip guide, constructed with a securing ring and eye, as in case of the tip guide.

It might be further stated that the construction of the securing ring is such as to permit the eye 9 to rotate freely within the securing ring to the end that as the fishing line moves herethrough and contacts with the fishing ring, the fishing ring will rotate, thereby constantly changing the wear surface between the fishing line and eye 9.

In the modified form of the invention as illustrated by Figure 3 of the drawing, the securing ring is braced by means of the arms 13 that extend from the ferrule 14, and are secured at their outer ends, to the securing ring indicated at 15.

The essential feature of the line guide, claimed herein, is the rotatable eye held by the securing ring, and this feature is claimed for the tip guide, as illustrated, and for each of the intermediate guides between the reel and the tip guide on a fishing casting rod.

What is claimed is:

A fishing rod line guide, comprising a supporting ring circular in cross-section, an eye member having a peripheral groove formed therein, the groove being offset with respect to one of the side edges of the eye member, providing a wide line-engaging surface at one side of the eye member, said supporting ring being positioned within said groove, rotatably supporting the eye member within the supporting ring, and arms connected to the supporting ring by means of which the guide is secured to a fishing pole.

OTIS D. TOUCHSTONE.